US007200568B2

(12) United States Patent
Dodd

(10) Patent No.: US 7,200,568 B2
(45) Date of Patent: Apr. 3, 2007

(54) CUSTOMIZED CUSTOMER PORTAL

(75) Inventor: Russell Charles Dodd, Cincinnati, OH (US)

(73) Assignee: The Procter & Gambel Company, Cincinnati, OH (US)

( * ) Notice: Subject to any disclaimer, the term of this patent is extended or adjusted under 35 U.S.C. 154(b) by 596 days.

(21) Appl. No.: 09/931,358

(22) Filed: Aug. 16, 2001

(65) Prior Publication Data

US 2003/0036978 A1 Feb. 20, 2003

(51) Int. Cl.
*G06F 17/60* (2006.01)
(52) U.S. Cl. .............................. 705/27; 705/1; 705/14; 705/26; 370/704
(58) Field of Classification Search ................. 705/27, 705/1, 14, 26; 370/704
See application file for complete search history.

(56) References Cited

U.S. PATENT DOCUMENTS

| 4,992,940 A | * | 2/1991 | Dworkin ...................... 705/26 |
| 5,117,354 A | * | 5/1992 | Long et al. .................... 705/27 |
| 5,590,197 A | * | 12/1996 | Chen et al. .................... 705/65 |
| 5,664,115 A | * | 9/1997 | Fraser .......................... 705/37 |
| 5,765,143 A | * | 6/1998 | Sheldon et al. ............... 705/28 |
| 5,819,232 A | * | 10/1998 | Shipman ........................ 705/8 |
| 5,825,881 A | * | 10/1998 | Colvin, Sr. ................... 380/24 |
| 5,826,240 A | * | 10/1998 | Brockman et al. ............ 705/11 |
| 5,826,241 A | * | 10/1998 | Stein et al. .................... 705/26 |
| 5,940,807 A | * | 8/1999 | Purcell ......................... 705/26 |
| 5,947,302 A |   | 9/1999 | Miller |
| 5,983,198 A | * | 11/1999 | Mowery et al. ............... 705/22 |
| 6,006,197 A | * | 12/1999 | d'Eon et al. .................. 705/10 |
| 6,014,644 A | * | 1/2000 | Erickson ....................... 705/37 |
| 6,023,683 A | * | 2/2000 | Johnson et al. ............... 705/26 |
| 6,092,053 A | * | 7/2000 | Boesch et al. ................ 705/26 |
| 6,093,027 A |   | 7/2000 | Unger et al. |
| 6,101,486 A | * | 8/2000 | Roberts et al. ............... 705/27 |
| 6,115,690 A | * | 9/2000 | Wong ............................ 705/7 |
| 6,134,318 A | * | 10/2000 | O'Neil ......................... 379/266 |
| 6,246,998 B1 | * | 6/2001 | Matsumori .................... 705/27 |
| 6,249,774 B1 | * | 6/2001 | Roden et al. ................. 705/28 |
| 6,272,472 B1 | * | 8/2001 | Danneels et al. ............. 705/27 |
| 6,282,517 B1 | * | 8/2001 | Wolfe et al. .................. 705/26 |

(Continued)

FOREIGN PATENT DOCUMENTS

WO    WO 97/44749    * 11/1997

(Continued)

OTHER PUBLICATIONS

White, Ron, How Computers Work, Millennium Ed. Que Corporation, Sep. 1999.*

(Continued)

*Primary Examiner*—Andrew J. Fischer
*Assistant Examiner*—John M. Winter
(74) *Attorney, Agent, or Firm*—Matthew P. Fitzpatrick; Leonard W. Lewis; Ken K. Patel

(57) ABSTRACT

Methods and systems for providing customized information to customers are disclosed. The systems and methods provide a holistic approach to providing sales support to a customer intending to purchase items for re-sale. Methods are disclosed by which information available to a seller regarding goods for sale may be selected and even tailored with respect to particular customer users of the method. Similarly, systems which accomplish similar results are also disclosed.

1 Claim, 2 Drawing Sheets

U.S. PATENT DOCUMENTS 6,324,522 B2 * 11/2001 Peterson et al. .............. 705/28
6,341,271 B1 * 1/2002 Salvo et al. .................. 705/28
6,574,608 B1 * 6/2003 Dahod et al. ................. 705/26
6,615,247 B1 * 9/2003 Murphy ...................... 709/217
6,662,193 B1 * 12/2003 Christensen ............. 707/104.1

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Hirschey, Mark, and Pappas, James L.; Managerial Economics, 8th Ed., The Dryden Press, Fort Worth, TX, 1996.*

Horngren, Charles T., and Sundem, Gary L., Introduction to Financial Accounting, Revised 3rd Ed., Prentice-Hall, Inc., 1988.*

* cited by examiner

CUSTOMIZED CUSTOMER PORTAL

FIELD OF THE INVENTION

This invention relates to methods and systems for providing customized information to customers. The systems and methods provide a holistic approach to providing sales support to a customer intending to purchase items for re-sale.

BACKGROUND OF THE INVENTION

Various types of interactive methods and systems associated with sales transactions have been known in the art. In recent years, a variety of interactive methods and systems have been automated in an attempt to appropriately and efficiently convey information needed and desired by purchasers in sales transactions. The advent of easily customizable computer systems such as those which can be implemented via the world wide web or similar interactive information systems has led to a great increase in the specialization and usefulness of information which can be provided to customers as part of transactions. Most of the use of such interactive systems, however, have been limited to transactions directed to an end user or consumer. For example, many manufacturers have used the world wide web for direct selling activities to consumers. Similarly, many merchants also use interactive systems to provide information to and take product orders from consumers.

Much of the focus in such interactive systems has surrounded such areas as more effective processing of payments or the rapid taking of orders from remote locations. Other areas of focus have included attempts to assist end consumers in selecting a product or mix of products which will best address the consumer's need for a given application. U.S. Pat. Nos. 6,093,027 & 5,947,302 describe systems of this type. Some systems, such as those described in U.S. Pat. No. 6,249,774 have attempted to profile customers for targeted marketing directed to end consumers.

While much of the focus in interactive systems involving purchasers and sellers of goods has been on the end consumer, there have also been some efforts directed at more "upstream" links, such as the link between manufacturers and their retailer or wholesale buyers. One example of such a system is described in U.S. Pat. No. 6,249,774 which generally describes an interactive system for inventory management. In this system, the distributor collects information through the interactive system regarding sales information (generated with respect to an initial inventory provided by the distributor). This information is used to keep track automatically of the inventory and to replenish it in accordance with the sales information collected.

The needs of those purchasing goods for re-sale (e.g. retailers, wholesalers, distributors) can differ significantly from those who purchase goods as the end user (i.e. consumers). A need exists to provide an interactive method which customizes information presented to intermediate purchasers as part of an improved sales support system. A need also exists to maximize the efficiency in the interaction between manufacturers and/or distributors and downstream intermediate purchasers of goods.

SUMMARY OF THE INVENTION

The present invention relates to methods and systems for providing customized information to customers. In one aspect, the invention may comprise a method. Such a method may include a step of providing an interface to a plurality of customers. The method may further comprise a step of receiving customer identification information from at least one of such customers. This step may be accomplished through the use of the interface. The method may also include a step of receiving an indication of purchase interest in at least one consumer product from at least one of the customers. In this step, the consumer product is selected the customer from a plurality of consumer products available for sale. Additionally, the identity of the plurality of consumer products is made known to the customers through the use of the interface. The method may also comprise a step of accessing customer information related to the customer from a preexisting database. The method may also comprise a step of providing to the customer product information regarding said at least one consumer product. Such information is provided through the use of the interface and the product information provided is customized on the basis of the customer information accessed in accessing step.

In one variation of the method, the interface may be provided on ore or more programmable computers. In another variation of the method, the interface may be a graphical user interface. In yet another variation of the method, the interface may be provided via the world wide web.

Another variation of the method may include accomplishing the indication of purchase interest through the use of representative icons. Additionally, the pre-existing customer database used in the method may comprise sales information with respect to the plurality of customers. In another variation, the steps of accessing customer information and providing information to a customer may be accomplished through the use of a pre-programmed relational database. In another variation, the product information provided may be customized on the basis of customer type. In another variation of the method, the product information provided may be customized on the basis of customer specific characteristics. In another variation of the method, the product information provided may comprise sales projection information calculated with respect to the customer.

In another aspect, the present invention may comprise a system. A system of the present invention may comprise a customer interface. The customer interface may be provided through the use of machine readable instructions resident on a machine readable format. The system may also comprise a customer information database. This database may comprise information contained in a machine readable format. The customer information database may also contains customer information records pertaining to each of a plurality of customers. Each of the customer information records may be associated with each of the customers for access by the system. The system may also comprise a product information database. This database may comprise information contained in a machine readable format. The product information database may contain product information records pertaining to each of a plurality of products. Each of the product information record may be associated with each of the products for access by the system. The system may also comprise one or more customization algorithms. These algorithms may be contained in a machine readable format. At least one of the algorithms may contain instructions sufficient to associate information contained in one or more of the customer information records with information contained in one or more of the product information records.

In one variation of the system, the customization algorithm may contain instructions sufficient to manipulate information contained in one or more of the product information records by performing calculations using input contained in one or more of the customer information records. This manipulation may be done to arrive at a computed result not previously contained in either the customer information database or the product information database. In another variation, this computed result may be capable of being displayed through the user interface.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings, in which:

DETAILED DESCRIPTION OF THE INVENTION

Figure 1:
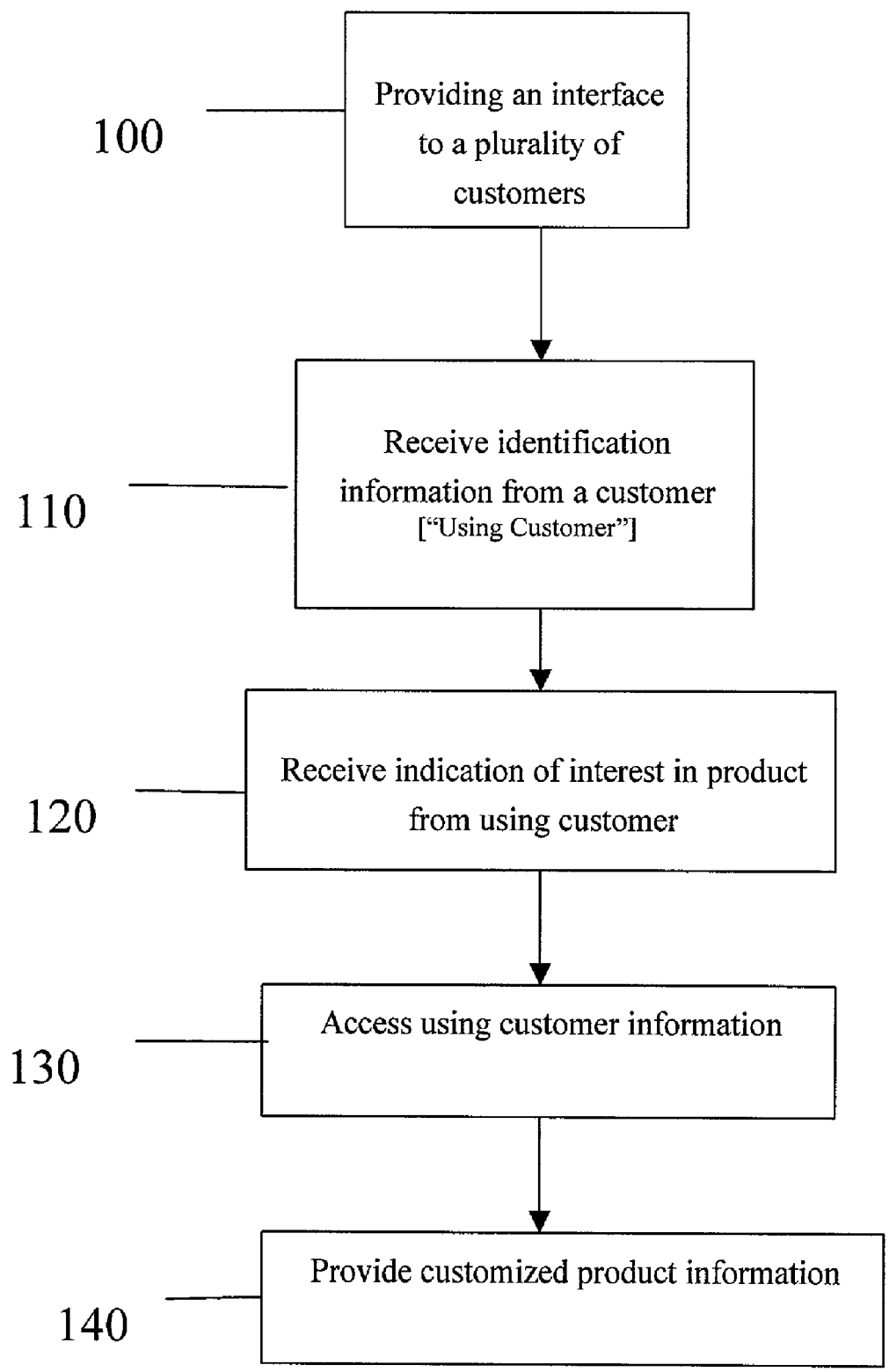
FIG. 1 is a block diagram representing the steps which may be performed in a method of the present invention.

This invention relates to methods and systems for providing customized information and improved sales support intermediate customers. For purposes of the present specification, the term "customer" will refer to any purchaser of goods where such purchaser intends to re-sell such goods to another entity, person, or groups of persons in the course of such customer's business. Therefore, any person, business, or entity which engages in the purchase and re-sale of goods is contemplated within the definition of "customer" as used herein. Examples of customers are retailers, distributors, and wholesalers. Put somewhat more inclusively, a "customer" for purposes of this specification is any purchaser of goods where such purchaser is not a "consumer" as defined herein.

The term "consumer" for purposes of this specification is any purchaser of goods where such purchaser will be the end user of such goods, or is not otherwise engaged in business or practice of sale of such goods to others. Persons of skill in the art will recognize that many goods are not purchased by the literal end user, but such purchasers are nonetheless "consumers" within this definition. For example, a parent who purchases household items for the family is a consumer even if the parent is not necessarily the end user of all or even any of the household items purchased. Similarly, a purchaser might purchase goods which ultimately are given to another as a gift or even sold through a casual sale (such as a garage sale) and still be within the definition of "consumer" as used herein. Persons who are not regularly engaged in the business of purchasing goods for sale to others, but rather purchase goods for other reasons (most typically personal or family use) are generally "consumers" for purposes of the present definition.

The term "seller" for purposes of this specification is any person, business, or entity which sells goods to customers. One of skill in the art will recognize that customers as that term is used in this specification (in accordance with its definition above), are also literally sellers of goods. Nevertheless, for purposes of the present specification, unless the context requires otherwise, references to "sellers" will typically refer to those who sell goods to customers.

The term "goods" for purposes of this specification has the meaning accorded this term in the common law of United States jurisdictions and the Uniform Commercial Code as adopted by the Several States of the United States. According to this definition, goods generally may be thought of as any tangible items which may reasonably be moved. This distinguishes goods from other classes of items which may be purchased and sold such as services, intangibles (such as patents, trademarks, securities, futures, options and the like), or real property (including improvements, fixtures, and similar items generally thought of as incident to real property). It will be readily appreciated that thousands of items of all sorts are goods, and that millions of people throughout the world routinely purchase goods at retail outlets of all types. Therefore, the systems and methods of the present invention which improve the effectiveness of the interaction between sellers and customers have great potential to have significant commercial and industrial utility. It will be appreciated that the benefits of such systems are both economic and technical (by way of time savings, resource allocation efficiencies, reduction in errors, etc.). The term "consumer products" as used in this specification is meant to include all items within the term "goods" as previously defined.

The methods and systems of the present invention relate generally to interactive mechanisms for completing sales transactions between sellers and customers. Methods and systems of the present invention are particularly useful when employed in the context of transaction involving "new goods." For purposes of the present specification, "new goods" refers to goods which are new to market generally, or to a particular region, outlet type, individual customer, or an improvement to an existing good which gives some degree of unfamiliarity with relevant particulars of subject goods. This enhanced benefit for new goods, however, does not mean that use of the present with respect to goods which are not new goods are not within the scope of the invention or are not subject to its benefits.

It has been found during development of the present invention that methods and systems which are effective in selling goods to customers are often significantly different from those effective in selling goods to consumers. Additionally, it has been found that methods and systems which take advantage of such technologies as interactive computer systems (such as the world wide web or other network arrangements), telephone systems, or other interactive communication systems for interaction with customers can often be more effective than attempts to use similar technologies for interactions with consumers. One reason for this difference is that tailoring of the provision of information to a customer can often be more readily and completely accomplished than attempts at tailoring the provision of information to consumers. This allows customers to make ordering (i.e. purchasing) decisions which are calculated to provide the most economic value to the customer. Such increased economic value of the transaction (as compared to not using the systems of the present invention) result in savings throughout the chain of sales which can be passed on to consumers.

In order to provide a more detailed understanding of the methods of the present invention, specific embodiments or executions of such methods will now be described. These embodiments are meant to be representative and are not exhaustive examples of the manner in which the invention may be practiced.

The present invention is generally implemented in the context of interactive systems through which customers may purchase goods for ultimate sale to consumers. Such systems may advantageously implemented via computer networks. Standard HTML based world wide web systems have been found to work well. While there is great variation subsumed within the general descriptor "world wide web," those of skill in the art will appreciate that using the teachings of this specification it is a routine matter to provide working systems which will work on a variety of known and commonly available computer systems and which will incorporate the features of the invention described herein.

A typical interactive system of the present invention could be provided using a world wide web based seller/customer interface. A system of the present invention could comprise one or more relational databases as part of its operating mechanism. Such databases could store information needed to identify particular customer users of the system as well as relevant data regarding such customer users. For example, upon entry of a customer ID, password, name, or similar identifier, the system could use an embedded relational database to access information pertaining to the identified customer. Such information pertaining to the customer could include sales volume, store locations, prior purchase history, business type of the customer, and the like. Such customer specific information could then be available for access by the system as described in greater detail below.

Use of such a seller/customer interface could comprise a step of providing information to a customer indicating various items available for purchase by a customer (i.e. items for sale by the seller). A customer would then be able to designate one or more of such items available for purchase about which to receive additional information. Up to this point, use of the interactive system is similar to many other systems currently available to both customers and consumers purchasing items for sale. A user may designate one or more items of interest by any suitable or convenient means. For example, "clicking" on an icon, the name of an item, or a picture or other graphic on the item when any convenient graphical user interface is used, is one suitable method of designating items of interest. Other methods could include pressing a number, button, or key corresponding to the items of interest or any other suitable designation mechanism. Voice recognition technology could also be incorporated into interactive systems of the present invention to allow a customer user to designate items of interest through spoken instructions.

Once an item or items for sale is designated by a customer, the system provides information to that customer about such items. The information provided should go beyond standard price, volume, size, and similar information, and include information on marketing and/or sales support available or planned for such items. For example, if an item selected is a new item, the system could provide information describing the marketing plans and projections for the item. Advantageously, the systems could provide information which is both useful to customer buyers and which is tailored to customer specific circumstances. Examples of information of both types will be provided in greater detail below.

The tailoring of information may be accomplished through the use of a suitable relational database or similar mechanism. Such a relational database may be an integral part of a larger database to accomplish other tasks with other databases within the system (such as a database for customer identification)—or may be a separate database having a desired degree of integration with other system databases. In one example, a relational database is used to identify specific customers by login ID or other conventional device. This ID may serve as a primary key to a relational database which database houses relevant customer specific data. Such data advantageously include information regarding customer location or region, sales data, outlet type, past purchase information, consumer profile, and the like.

One preferred example of tailored information which can be provided to customers is an estimate of payout (resulting from sales) of seller promotional activity based on data specific to a given customer. For example, if the seller is a manufacturer and is planning a direct mailing sampling and coupon campaign for a given item, the database could contain algorithms allowing the system to compute an estimated payout of such promotional activity for a given customer. Such an estimate may be based upon historic sales data for similar promotional activities for similar items. Such historic sales date could be obtained from previous experience with the customer. Additionally, such historic sales information could be obtained from third party (and typically commercially available) databases. In this manner, the information presented to customers when ordering items for sale is specifically calculated to be relevant to that customer's business and allows the customer to make the most beneficial purchase decisions.

In addition to providing customer specific item information, the system of the present invention can, and preferably does, provide to customers market support information known to the seller. For example, when presenting items available for order by a customer, and indication of interest could be followed by an opportunity to view upcoming advertising plans and sample copy for the item.

FIG. 1 is a flow diagram which shows the steps in a method of the present invention which might be practiced by a seller customer. For clarity sake, these steps will be discussed in the order shown in FIG. 1. In many cases, sellers providing the described interface to customers will practice the method steps in the order shown in FIG. 1. It should be noted, however, that the order in which the steps of the method are performed is not critical and the claims of this specification should not be interpreted as requiring steps to be performed in any particular order.

As shown in FIG. 1, a method of the present invention may comprise a steps of providing an interface to a plurality of customers, represented as box 100. A web site hosted on a suitable central computer system works well for providing such an interface to multiple customers. It is not necessary that multiple customers actually access the interface at any one time. As long as the interface is available (i.e., provided) so that it could be accessed by a variety of customers (even if the interface could only be used by one customer at a time), it meets the requirements of this step. Even a menu driven telephone system could meet this definition. A web site is preferred for the interface, but numerous interfaces are possible. It is also recognized that as software and hardware capabilities increase, other computer based interfaces are likely which will come within the definition used herein, even though such interfaces may no longer be thought of as "web sites" as this term is currently understood by those of skill in the art.

The method of the present invention may also comprise a step of receiving identification information from at least one customer. This step is represented as box 110. For ease of identification, the customer from which this identification information is received will be described as the "using customer." This step is typically accomplished by entry of a password and/or customer identifier. Of course, a variety of techniques are suitable by which to identify the using customer. It is possible to identify the using customer on the basis of information previously recorded (for example through the use of technique commonly referred to as "cookies"). Any of these mechanisms are suitable for this step of the method.

Box 120 of FIG. 1 represents a step of the invention by which an indication of interest in one or more products is received from the using customer. The indication of interest is provided through the use of the interface provided in the step depicted in box 100. Any suitable icon, logo, label, name, or other identifier of one or more products may be used for this purpose.

FIG. 1 also depicts at box 130 a step of accessing using customer information. This information preferably is contained within a pre-existing database which is operationally related to the interface. One of skill in the art will readily appreciate that if the interface is provided in a web browser context, associating the resulting web site to a computer based relational database is easily accomplished.

The method of the present invention may also comprise a step represented in box 130. This step is providing customized product information to the using customer. The information is customized on the basis of the information related to the customer accessed in the step shown in box 120.

The customization step shown in box 130 may be accomplished in a wide variety of manners. One effective type of customization is on the basis of the industry type of the customer. For example, consumer products are often sold in a variety of retail outlets. These outlets may be of such types as grocery stores, drug stores, mass merchandising stores (such as department-type stores), and "club-type" discount centers. Sophisticated sellers of goods will often have a great deal of information about their products which is highly valuable to their customers. As an example, such a sophisticated seller may have detailed shelving strategies which are tailored to the type of store a customer operates. While both grocery stores and drug stores might sell a given line of consumer products, the shelving strategies which have been found to be most effective for each may vary signifcantly. Therefore, many sellers will create a shelving strategy for grocery (or food) stores, and a separate strategy for drug stores. By using the method of the present invention a seller can automatically provide a using customer with a shelving strategy which is best adapted to that customer's type of business. This can be done without the customer having to self-select from a list of options or having to see options which are not applicable to her business.

In the shelving strategy example given above, the relational database referred to in connection with box 130 could contain information regarding customer store type (such as the categories of grocery, drug, etc., described above). This customer type information contained in the database could be related to shelving strategies for the various products which are appropriate for the different types of customers. In this manner it is possible to provide a drug store customer with shelving strategies geared to drug stores for each product selected by such a customer.

In addition to shelving strategies, a wide variety of other information can be customized on the basis of the business type of the customer. For example in store (or even out of store) marketing plans may differ for the different types of customers described above (e.g. drug stores, grocery stores, mass merchandise stores, club stores, etc.). The method of the present invention may be used to customize marketing strategies to customers on the basis of type of store. Other bases by which to customize marketing strategies could include size of store (in terms of sales, for example), location of customer, or other relevant factors. A large seller of goods (such as one which sells to customers nationally or even worldwide) will typically have customers located in many distinct advertising regions. Therefore, information regarding advertising plans relating to one or more products of interest could be tailored on the basis of cutomer location using the method of the present invention. For example, a drug store chain customer with stores located in the northeast portion of the United States and with interest in purchasing laundry detergent could receive information regarding the advertising plans of the seller regarding such laundry detergent in this part of the country. Plans for other products or plans for advertising in other regions would not be presented. The customer could be provided the opportunity to view copy, to receive information regarding coupons or other promotions, or any other information desired to be provided.

Many of the examples of the customizing of information described above have been "categorical" examples. In other words, information is customized on the basis of one or more categories in which a particular customer might fit. Such categories could include size, location, store type, etc. The method of the present invention is also particularly well suited for customizing information in a manner which may be unique to a given customer. An example of this may be the calculation of sales projections for a particular customer with respect to a particular item or line or items. In one scenario, a using customer may be a drug store chain located primarily in the southern United States with 85 store locations. This customer may express interest in an improved wet cloth mop product for sale in its stores. The improved wet cloth mop product may be part of a brand line up which includes a dry cloth mop product of which the wet cloth product is designed to be an upgrade. The information provided to this customer about the wet cloth mop in the step reprented in box 140 could include a projection of expected sales by this customer of the wet cloth mop in its 85 stores. This projection may be calculated by taking such factors into account as the total sales projections for the product, the percentage of such sales expected to be made in drug store channels, the percentage of this customer's sales compared to overall sales for similar products, the projected impact of selling both mops in the line up as compared to just the wet cloth product, etc.

It will be readily appreciated that by using a series of relational databases and the computing power of presently available computers, highly specific and useful information can readily be generated and provided to a wide variety of customers.

The present invention has thus far largely been described in terms of method steps. The present invention does indeed provide a novel method for tailoring and providing information to customers. It is also desirable to provide an integrated system or apparatus by which the benefits of the present invention may be realized. The terms "integrated system" and "apparatus" may be fairly non-specific. Some examples help to clarify the meaning ascribed to these terms. The present invention may comprise a seller/customer interface software system resident on one or more programmable computers. Typically, a "host" computer system may contain appropriate instructions such as databases, algorithms, and interface programming. If a world wide web based system is used, the interface may be accessed from variety of remote locations by customers. It is appreciated that additional equipment (such as a client computer) is typically necessary to access the host system functionality. However, for purposes of this description, providing the capability to access an interface having the functionality described is sufficient. In other words, programming of a computer to host a web site integrated with the capabilities described as part of the invention is sufficient to make the invention within the meaning of the claims.

Figure 2:
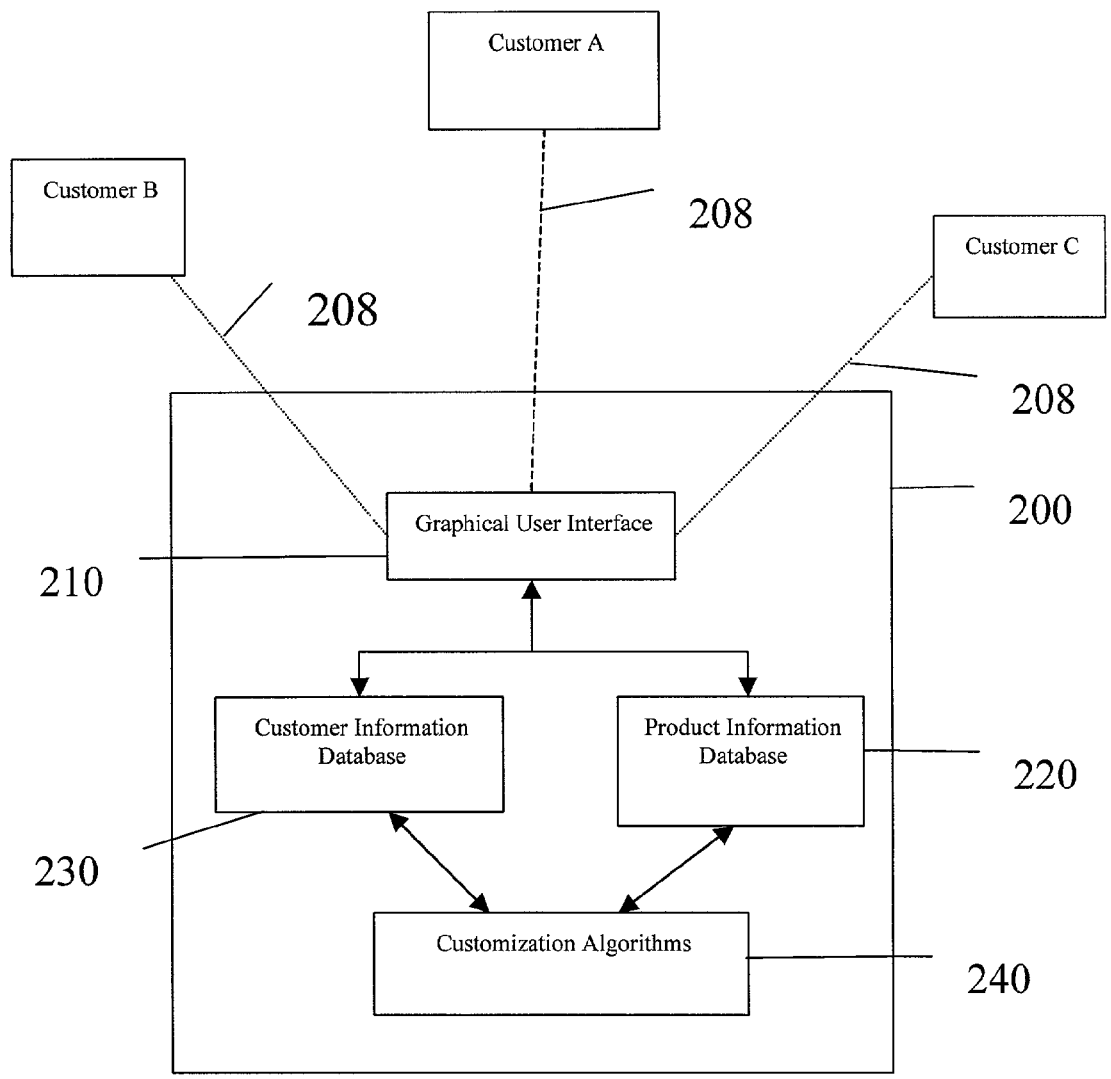
FIG. 2 is a block diagram representing the components of a system of the present invention.

FIG. 2 is a block diagram which represents parts of a system of the present invention. The system of the present invention is represented generally by system 200. The components of system 200 may be contained on one or more programmable computers or other suitable mechanism. Preferably, a single appropriately programmed computer is used to provide system 200. The sub-blocks within system 200 may be thought of as "modules" within the overall system 200. These modules contain appropriate computer instructions to provide the functionality described.

A first feature of a system of the present invention is a suitable user interface such as graphical user interface 210. As noted earlier, the interface need not necessarily be graphical or visual, but can be voice based. Additionally, it is sufficient for the system 200 to provide the necessary computer instructions such that user graphical user interface 210 can be accessed by remote users, such as customers A, B, and C. One of skill in the art will recognize that such customers may use their own keyboard, monitors, computers, mouse, and similar hardware to access the user interface 210 of system 200. Nevertheless, the necessary programming to enable the interface 210 is all that is required to practice the system of the present invention. Remote users, such as customers A, B, and C, will typically access the system 200 through the use of remote connections such as remote connections 208. The manner in which these connections may be made are within the routine skill in the art and are not within the scope of the present invention. Standard internet protocols through the use of public or private networks are sufficient.

The system 200 of the present invention may also comprise a customer information database 230. The customer information database 230 may have a record for each customer. Each customer may be associated with a unique customer ID. The customer ID may serve as the primary key in a relational database. The records associated with each customer may contain any of the information previously described in the method context (e.g. customer type, location, sales, etc.). The system 200 also may comprise a product information database 220. The product information database also may consist of a series of records where each product offering is associated with an information record (in other words, the product offering may be the primary key of a second relational database). The information record for each product may contain any of the information previously described above when describing methods of the present invention. Such information may comprise, for example, marketing strategies, sales promotion information, sales projection data, etc.

The customer information database 230 and the product information database 220 may share information with each other through the use of customization algorithms 240. These algorithms may be simple, such as associating a customer store type with one of several available shelving strategies with a particular product. These algorithms may also be more complex such as containing detailed logic sufficient to calculate sales projections for a given product for a unique customer. Any of the examples previously discussed may be incorporated into the programming of a system of the present invention. The information accessed and manipulated by the customer information database 230, the product information database 220, and the customization algorithms 240 may be accessed by and displayed through the user interface 210. In this manner, each using customer has simple access to the customized information provided by the system 200 without having to undergo complex navigation to determine the location of such information.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art that various other changes and modifications can be made without departing from the spirit and scope of the invention.

What is claimed is:

1. A method comprising the steps of:
  a) providing an interface to a plurality of customers, wherein said customers are purchasers of goods for subsequent sale to consumers,
  b) receiving customer identification information from at least one of said customers, said receiving being accomplished through the use of said interface,
  c) receiving from at least one of said customers an indication of purchase interest in at least one consumer product, wherein said at least one consumer product is selected by said at least one of said customers from a plurality of consumer products available for sale, wherein the identity of said plurality of consumer products is made known to said plurality of customers through the use of said interface,
  d) accessing customer information related to said at least one of said customers from a pre-existing database,
  providing to said at least one of said customers product information regarding said at least one consumer product through the use of said interface, wherein said product information provided is customized on the basis of said customer information accessed in step (d), and wherein at least some of the product information provided comprises consumer sales projection information calculated with respect to said at least one of said customers, wherein said sales projection information is customized on the basis of planned promotional activities with respect to said at least one consumer product.

* * * * *

UNITED STATES PATENT AND TRADEMARK OFFICE
CERTIFICATE OF CORRECTION

PATENT NO. : 7,200,568 B2
APPLICATION NO. : 09/931358
DATED : April 3, 2007
INVENTOR(S) : Russell Charles Dodd It is certified that error appears in the above-identified patent and that said Letters Patent is hereby corrected as shown below:

Title Page
(73) Assignee:, delete "Gambel" and insert --Gamble--.

Signed and Sealed this

Seventeenth Day of July, 2007

JON W. DUDAS
*Director of the United States Patent and Trademark Office*